(12) United States Patent
Schwartz et al.

(10) Patent No.: US 10,856,542 B2
(45) Date of Patent: Dec. 8, 2020

(54) **UNMANNED AERIAL VEHICLE SYSTEM FOR DETERRING *AVIAN* SPECIES FROM SENSITIVE AREAS**

(71) Applicant: Florida Power & Light Company, Juno Beach, FL (US)

(72) Inventors: Eric D. Schwartz, Palm Beach Gardens, FL (US); David C. Niebch, Port Saint Lucie, FL (US)

(73) Assignee: Florida Power & Light Company, Juno Beach, FL (US)

( * ) Notice: Subject to any disclaimer, the term of this patent is extended or adjusted under 35 U.S.C. 154(b) by 324 days.

(21) Appl. No.: 15/827,576

(22) Filed: Nov. 30, 2017

(65) Prior Publication Data

US 2019/0159444 A1   May 30, 2019

(51) Int. Cl.
*A01M 29/06* (2011.01)
*B64C 39/02* (2006.01)
*G05D 1/00* (2006.01)
*G05D 1/08* (2006.01)

(52) U.S. Cl.
CPC .......... *A01M 29/06* (2013.01); *B64C 39/024* (2013.01); *B64C 2201/12* (2013.01); *B64C 2201/141* (2013.01); *G05D 1/0088* (2013.01); *G05D 1/0808* (2013.01)

(58) Field of Classification Search
CPC .............................. A01M 29/06; B64C 39/024
See application file for complete search history.

(56) References Cited

U.S. PATENT DOCUMENTS

| | | | |
|---|---|---|---|
| 5,450,063 A | 9/1995 | Peterson et al. | |
| 6,250,255 B1 | 6/2001 | Lenhardt et al. | |
| 6,653,971 B1 | 11/2003 | Guice et al. | |
| 7,052,348 B2 | 5/2006 | Price et al. | |
| 7,948,429 B2 | 5/2011 | Drake et al. | |
| 8,598,998 B2 * | 12/2013 | Vassilev ................ | A01M 29/16 340/384.2 |
| 8,742,977 B1 | 6/2014 | Piesinger | |
| 8,812,156 B2 | 8/2014 | Lee et al. | |
| 8,988,230 B2 | 3/2015 | Nohara et al. | |
| 9,474,265 B2 * | 10/2016 | Duncan ................. | A01M 29/10 |
| 9,581,165 B2 | 2/2017 | Babbitt et al. | |
| 2010/0201525 A1 | 8/2010 | Bahat et al. | |
| 2011/0144829 A1 | 6/2011 | Kim et al. | |

(Continued)

FOREIGN PATENT DOCUMENTS

| | | |
|---|---|---|
| CN | 102379277 A | 3/2012 |
| CN | 205390157 U | 7/2016 |

(Continued)

*Primary Examiner* — Anne Marie Antonucci
*Assistant Examiner* — Abdalla A Khaled
(74) *Attorney, Agent, or Firm* — Thomas Grzesik; Fleit Intellectual Property Law

(57) ABSTRACT

Systems and methods for deterring avian species from approaching a sensitive area. A determination is made that a bird is approaching a sensitive area. A predefined flight path is selected from a plurality of predefined flight paths based on the determination that the bird is approaching the sensitive area. Each of the predefined flight paths of the plurality of predefined flight paths is configured to avoid objects within the sensitive area. An unmanned aerial vehicle is instructed to traverse the predefined flight path that has been selected.

19 Claims, 6 Drawing Sheets

(56) References Cited

U.S. PATENT DOCUMENTS

| | | |
|---|---|---|
| 2014/0261151 A1 | 9/2014 | Ronning |
| 2015/0127209 A1 | 5/2015 | Al-gami et al. |
| 2015/0230450 A1* | 8/2015 | Norris .................. A01M 29/18 367/139 |
| 2017/0027155 A1 | 2/2017 | Ehrlich et al. |
| 2017/0055517 A1 | 3/2017 | Morente et al. |
| 2019/0110461 A1* | 4/2019 | Caskey ................ A01M 29/10 |
| 2019/0152595 A1* | 5/2019 | Mitchell ............... A01M 29/10 |

FOREIGN PATENT DOCUMENTS

| | | |
|---|---|---|
| DE | 202014009166 U1 | 12/2014 |
| KR | 20160133956 A | 11/2016 |
| KR | 101762511 B1 | 7/2017 |
| WO | WO2015139091 A1 | 9/2015 |
| WO | WO2015187172 A1 | 12/2015 |
| WO | WO2017124129 A1 | 7/2017 |

* cited by examiner

UNMANNED AERIAL VEHICLE SYSTEM FOR DETERRING AVIAN SPECIES FROM SENSITIVE AREAS

FIELD OF THE DISCLOSURE

The present invention generally relates to electrical power distribution systems, and more particularly to detecting and deterring avian life from interfering with an electrical power substation.

BACKGROUND

Electrical power substations are an integral part of a power grid. For example, substations perform various functions such as transforming voltage, connecting two or more transmissions lines, transferring power, and protecting the grid from short circuits and overload currents. In many instances substation equipment is susceptible to damage, which may result in power outages throughout the grid. Power outages decrease customer satisfaction and damaged substation equipment increases costs incurred by the utility provider.

One cause of damage to substation equipment are birds. Birds are attracted to substations due to their location, generation of heat, size/height of the equipment, and various other factors. When birds perch or build nests on substation equipment their droppings accumulate over time, which can corrode equipment and pose a health hazard to substation workers. In addition, a bird may inadvertently contact live wires or bridge energized equipment causing imminent harm to itself and damaging substation equipment.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
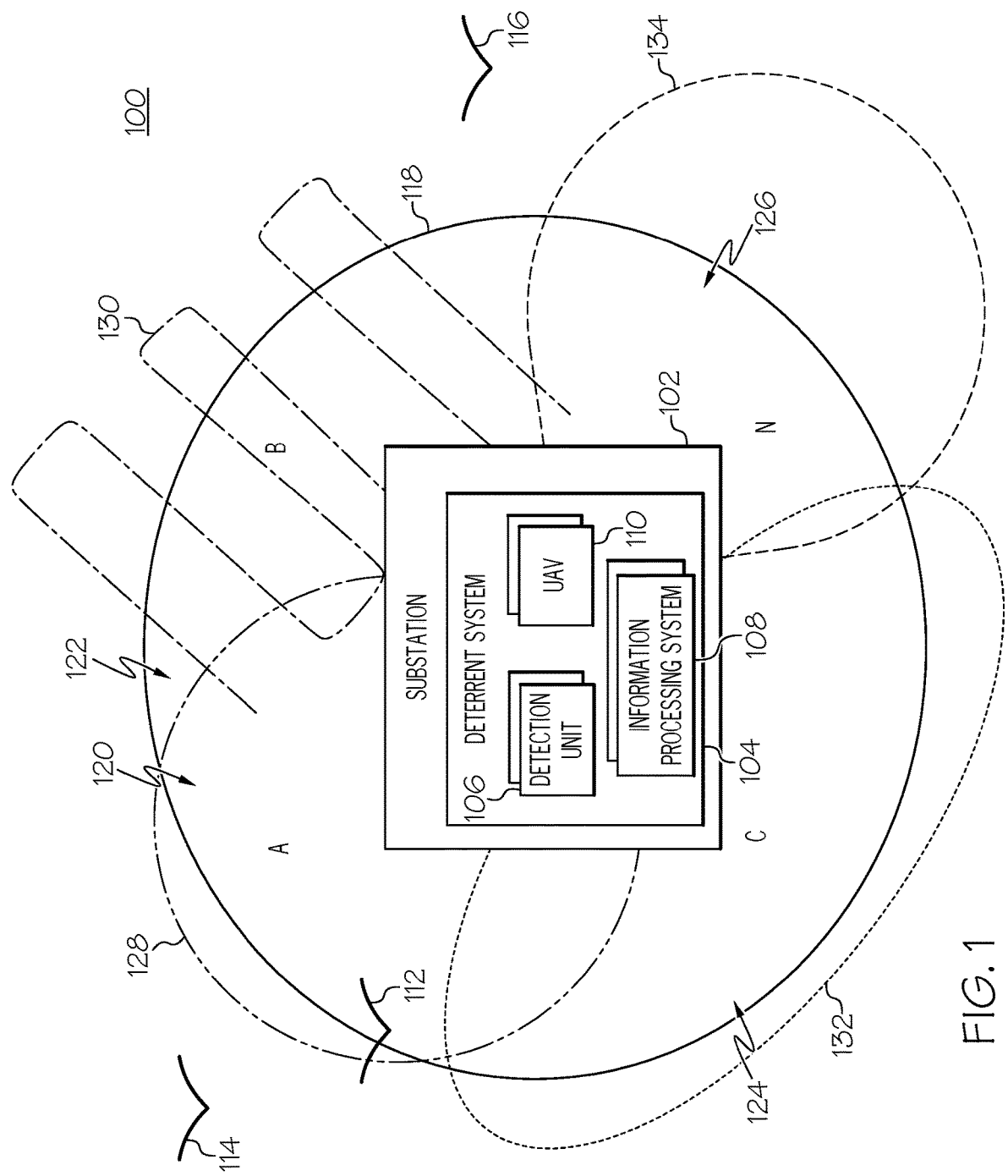
FIG. 1 is a block diagram illustrating one example of a system for deterring birds from entering a sensitive area according to one embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having", as used herein, are defined as comprising (i.e., open language). The term "coupled", as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide an avian deterrence system for sensitive areas such as electrical power substations, electrical power generation stations including renewable solar and wind turbine farms, and other areas where avian species can adversely affect operations. The term bird as used herein includes any avian species having a flying capability. In one example, the deterrence system determines that a bird is approaching the sensitive area. This determination may be made based on upon one or more signals received from a detection unit indicating detection of the bird. The deterrence system selects a predefined flight path from a plurality of predefined flight paths based on determining the bird is approaching the sensitive area. Each predefined flight path of the plurality of predefined flight paths may be associated with at least one portion of a geographical area surrounding the sensitive area. Also, each predefined flight path of the plurality of predefined flight paths may be configured to avoid objects within the sensitive area.

In one example, the predefined flight path is selected from the plurality of predefined flight paths based on the deterrence system determining that the bird is within a threshold distance from the sensitive area. In another example, the deterrence system determines a location of the bird with respect to the sensitive area. Then, the deterrence system determines at least one predefined flight path from the plurality of predefined flight paths that corresponds to the location of the bird. The deterrence system selects the at least one predefined flight path based on the predefined flight corresponding to the location of the bird. The deterrence system then instructs an unmanned aerial vehicle to traverse the predefined flight path that has been selected. If the deterrence system determines that the bird is beyond a given threshold distance from the sensitive area, the deterrence system may instruct the unmanned aerial vehicle to return to a home location.

FIG. 1 shows one example of an operating environment 100 for detecting and deterring avian life from interfering with substation equipment. In one embodiment, the operating environment 100 comprises a sensitive area such as an electrical power substation 102. The substation 102 may perform various functions for a power grid such as transforming voltage, connecting transmissions lines, transferring power, and protecting the grid from short circuits and overload currents, and/or the like. Components of the substation 102 include, but are not limited to, incoming and outgoing power lines, transformers, disconnect switches, circuit breakers, arresters, etc.

As discussed above, the substation components are susceptible to damage caused by birds. For example, birds may inadvertently contact live wires or bridge energized equipment causing imminent harm to theirselves and damaging substation equipment. However, one or more embodiments of the present invention protect substations from birds (and birds from substations) by implementing a deterrent system 104 within and/or surrounding the substation. The deterrent system 104 comprises one or more detection units 106, one or more information processing systems 108, and one or more unmanned aerial vehicles (UAVs) 110 such as a drone. It should be noted that although FIG. 1 shows these components as being located within the substation 102, one or more of these components may be located external to the substation 102 as well. Also, although shown as being separate from the detection unit(s) 106, the information processing system 108 may be part of the detection unit(s) 106 as well. In addition, the information processing system 108 may be a cloud-based information processing system as well.

As will be discussed in greater detail below, the deterrent system 104 detects when one or more birds 112, 114, 116 have entered a predefined area 118 (also referred to herein as a "geofence 118") surrounding the substation 102. The UAV(s) 110 is then programmed with a predefined flight path/pattern by the information processing system(s) 108 (or by the UAV itself). The UAV(s) 110 automatically traverses the predefined flight path/pattern to deter the bird 112 from approaching the substation 102.

Figure 2:
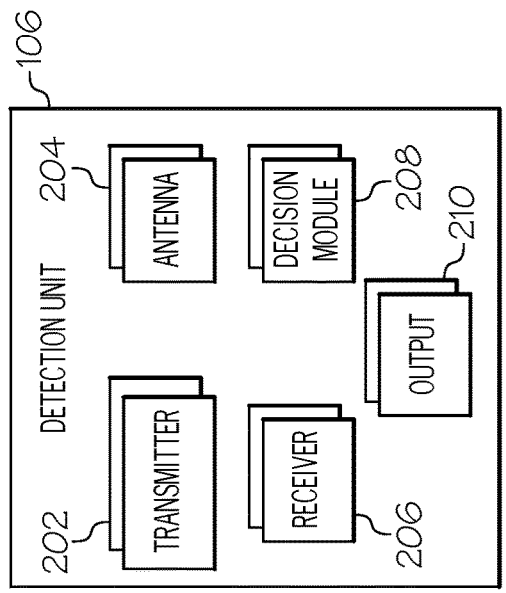
FIG. 2 is a block diagram of a detection unit according to one embodiment of the present invention.

FIG. 2 shows the detection unit 106 in greater detail. In this example, the detection unit 106, in one embodiment, comprises one or more transmitters 202, antennas 204, receivers 206, decision modules 208, and outputs 210. The transmitter 202 generates electromagnetic waves such as radio waves and the antenna 204 sends the electromagnetic waves out into the surrounding environment. The antenna 204 also receives electromagnetic waves reflected back from various objects such as birds 112. The receiver 206 processes and detects the waves/signals received by the antenna 204. The decision module 208 compares the output generated by the receiver 206 to one or more thresholds to determine if an object is present. The output 210 is generated by the decision modules 208 and may comprise information such as whether an object has been detected, distance of the object from the detection unit 106, speed of object, type of object detected, etc. In one embodiment, the detection unit 106 is a Radio Detection and Ranging (RADAR) system. However, the detection unit 106 is not limited to RADAR systems and other systems such as Light Detection and Ranging (LIDAR) systems, Sound Navigation And Ranging (SONAR) systems, ultrasonic-based systems, and/or the like may be utilized in place of and/or in addition to a RADAR system(s).

In some embodiments, a single detection unit 106 is disposed within or outside of the substation 102. In this embodiment, the single detection unit 106 is able to rotate and transmit/detect signals (e.g., electromagnetic waves, light waves, sound waves, etc.) within a 360-degree field. In other embodiments, multiple detection units 106 are disposed within and/or outside of the substation 102. In this embodiment, each detection unit 106 is responsible for transmitting and detecting signals within a given sector/portion 120 to 126 of the predefined area 118 surrounding the substation being monitored. Alternatively, each (or a subset) of the multiple detection units 106 may be able to transmit and detect signals within a 360-degree field as well.

Figure 3:
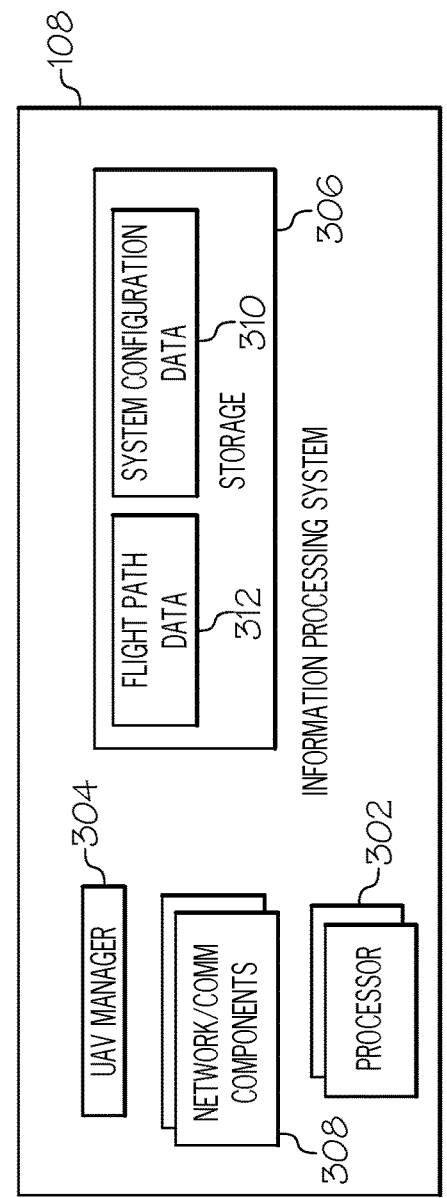
FIG. 3 is a block diagram showing various components of an information processing system according to one embodiment of the present invention.

FIG. 3 shows the information processing system 108 in greater detail. In this example, the information processing system 108 comprises one or more processors 302; a UAV manager 304, a storage unit(s) 306 such as random-access memory, cache, solid state drives, hard drives, and/or the like; and network/communication components 308 such as a network controller, wireless communication mechanisms (e.g., Wi-Fi based transmitter/receiver, cellular-based transmitter/receiver etc.), and wired communication mechanisms (e.g., fiber optic cables. copper-based cables, twisted pair cables, etc.). The information processing system 108 utilizes the network/communication components 308 to communicate with, for example, the detection unit(s) 106, the UAV(s) 110, and other computing devices. It should be noted that, in some embodiments, the information processing system 108 is not required and the components of the system 108 are implemented within the UAV 110. In some embodiments, the UAV manager 304 is part of the processor 302, is the processor 302, or is a separate processor.

As will be discussed in greater detail below, the UAV manager 304 receives the output 210 from a detection unit 106 and instructs the UAV 110 to traverse one or more predefined flight patterns 128 to 134 (FIG. 1) based on the detection unit output 210. In one embodiment, the storage unit 306 comprises system configuration data 310 and predefined flight path data 312. The system configuration data 310 comprises information such as coordinates defining the geofence 118, location of the detection unit(s) 106, geofence sector (if any) associated with the detection unit(s) 106, unique identifier of each UAV 110, etc. The predefined flight path data 312 comprises data that is utilized by the UAV 110 for automatic flight along a predefined path.

Figure 4:
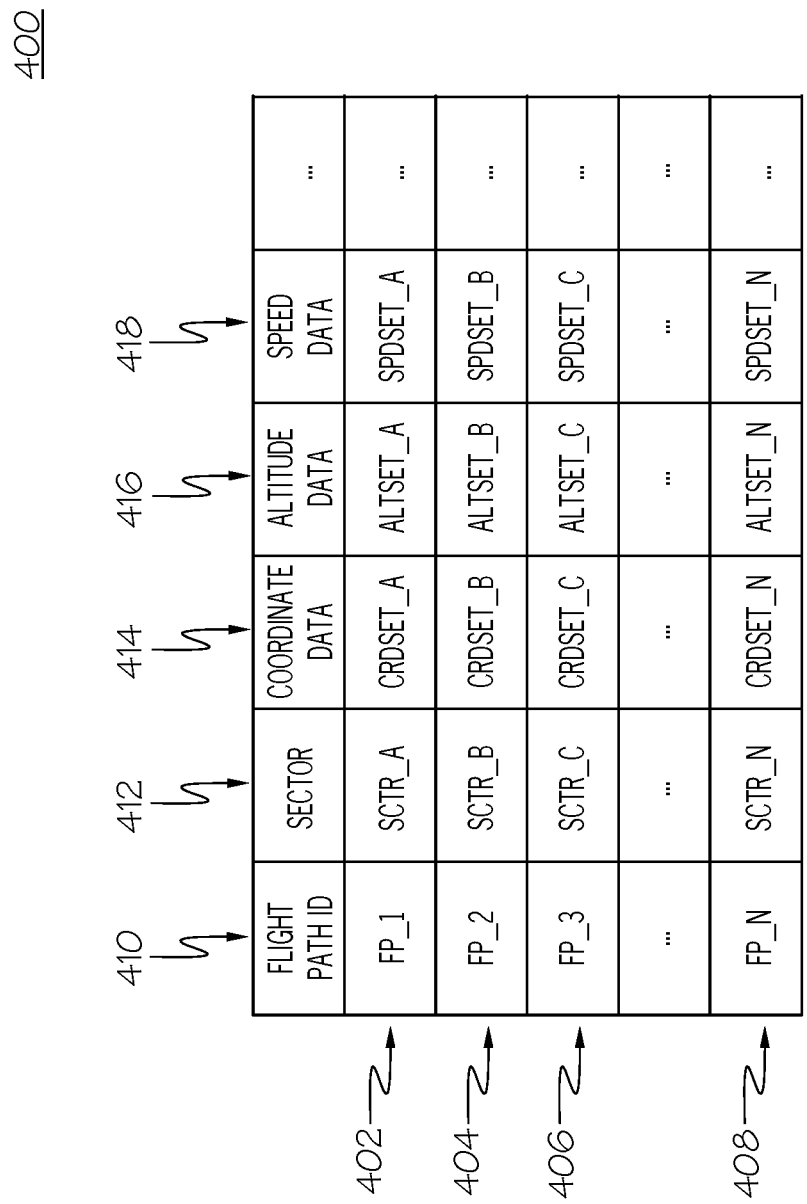
FIG. 4 illustrates various examples of predefined flight path data according to one embodiment of the present invention.

FIG. 4 shows various examples of predefined flight path data represented as a table 400. In the example shown in FIG. 4, each row 402 to 408 in the table 400 corresponds to a predefined flight path. It should be noted that in other embodiments, each predefined flight path 402 to 408 is stored separate from one another. The table 400 comprises a plurality of columns, each storing a different set of information. In this example, the table 400 comprises a first column 410 entitled "Flight Path ID"; a second column 412 entitled "Sector"; a third column 414 entitled "Coordinate Data"; a fourth column 416 entitled "Altitude Data"; and a fifth column 418 entitled "Speed Data". It should be noted that predefined flight path data 312 is not limited to the items shown in FIG. 4 as one or columns may be removed or additional columns added.

The "Flight Path ID" column 410 comprises entries 420 uniquely identifying each flight path in the flight path data. The "Sector" column 412 comprises entries 422 identifying a given sector/portion of the geofence 118 for which the predefined flight path is to be selected. In one embodiment, the geofence 118 is divided into a plurality of different sectors 120 to 126 each defined by a different set of coordinates. However, in one or more embodiments, some coordinates between different sectors may overlap. It should be noted that in some embodiments, multiple predefined flight paths may be associated with the same sector. For example, flight path FP_1 and FP_2 may be associated with the same sector, Sctr_A. In other embodiments, the geofence 118 is not divided into different sectors.

The "Coordinate Data" column 414 comprises entries 424 with coordinate data, which may be in three-dimensional space, defining a path and pattern of flight. For example, FIG. 1 shows a plurality of different flight paths 128 to 132 having been defined for different sectors 120 to 126 of the geofence 118. Two or more of the predefined flight paths may have a different flight pattern or all flight paths may have the same flight pattern. In one embodiment, the coordinates of a flight path are predefined such that the UAV 110 avoids colliding with any of the substation components. In addition, two or more predefined flight paths may have coordinates that overlap with each other.

The "Altitude Data" column 416 comprises entries 426 having altitude data for the corresponding flight path. For example, the altitude data may define a given altitude the UAV 110 is to fly at while traversing the corresponding flight path. In some embodiments, the altitude data may include different altitudes for different portions of the flight path. The different altitudes may be time-based and/or coordinate-based. The "Speed Data" column 418 comprises entries 428 having speed data for the corresponding flight path. For example, the speed data may define a given speed the UAV 110 is to fly at while traversing the flight path. In some embodiments, the speed data may include different speeds for different portions of the flight path. The different speeds may be time-based, altitude-based, and/or coordinate-based. In some embodiments, the flight path data also comprises additional information such as visual deterrence and/or audible activation data. For example, one or more flight paths may comprise data that instructs the UAV 110 when to activate a visual deterrence mechanism and/or an audible deterrence mechanism based on time, coordinates, altitude, speed, and/or the like.

Figure 5:
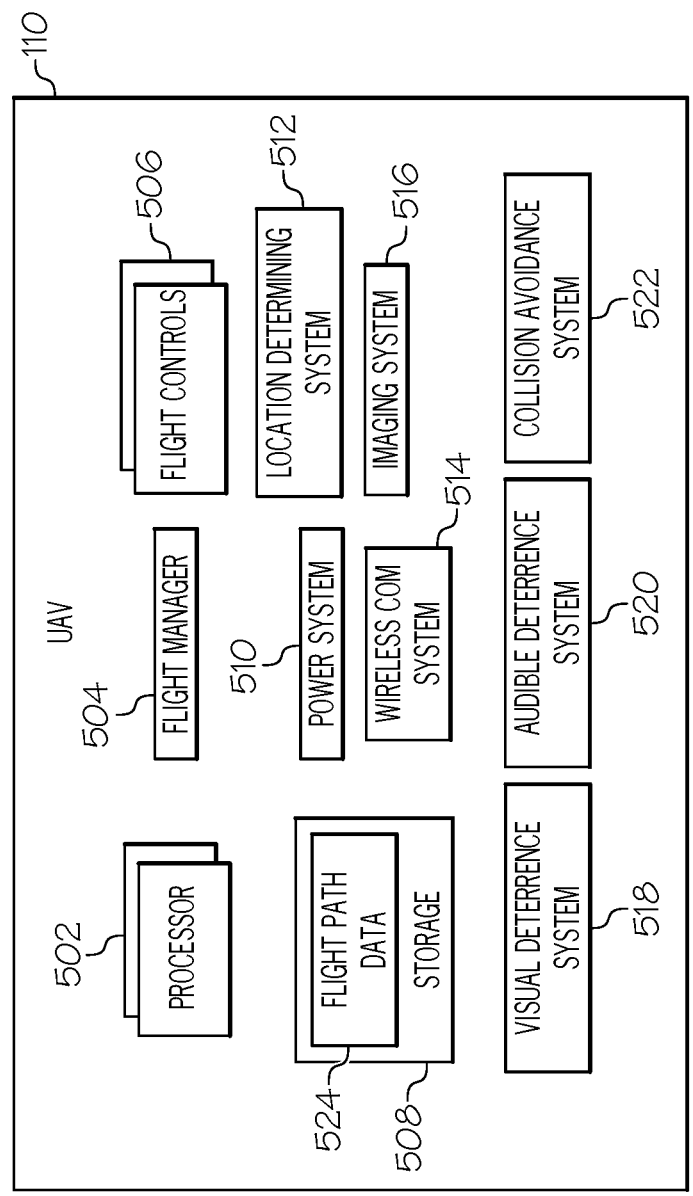
FIG. 5 is a block diagram showing various components of an unmanned aerial vehicle according to one embodiment of the present invention.

FIG. 5 shows the UAV 110 in greater detail. In this example, the UAV 110 comprises one or more processors 502, a flight manager 504, flight controls 506, storage unit(s) 508, one or more power systems 510, a location determining system 512, a wireless communication system 514, an optional imaging system 516, an optional visual deterrence system 518, an option audible deterrence system 520, and an optional collision avoidance system 522. The processor(s) 502 performs various computing functions for the UAV 110. The flight manager 404 receives instructions from the information processing system 108 indicating the UAV 110 is to initiate flight and follow a predefined flight path. The flight manager 504 also controls the automated flight operations of the UAV 110. In some embodiments, the flight manager 504 may also receive output 210 from one or more detection units 106. In this embodiment, the flight manager 504 analyzes this output to determine if flight should be initiated and which of the predetermined flight paths 128-132 it should follow, similar to operations of the information processing system 108 discussed herein. In some embodiments, the flight manager 504 may be part of the processor 502, is the processor 502, or is a separate processor.

The flight controls 506 comprise various mechanisms and components such as propellers, motors, gyroscopes, accelerometers, and/or the like that allow the UAV 110 to take flight. The flight controls 506 are automatically managed and controlled by the flight manager 504 and/or processor 502. The storage unit(s) 508 include random-access memory, cache, solid state drives, hard drives, and/or the like. In one embodiment, the storage unit(s) 508 comprises flight path data 524.

The flight path data 524, in some embodiments, is received by the flight manager 504 from the information processing system 504. The flight path data 524 includes the information discussed above with respect to FIG. 4. For example, flight path data 524 includes predefined flight path data such as the coordinates of one or more predefined flight paths, altitude data associated with the one or more flight paths, and speed data associated with the one or more flight paths. In some embodiments, the flight path data discussed above with respect to FIG. 4 is stored at the UAV 110 as compared to (or in addition to) being stored at the information processing system 108. In this embodiment, the flight manager 504 of the UAV 110 may receive an instruction from the information processing system 108 indicating that the UAV 110 is to initiate flight along with the identifier of the flight path to be taken. The flight manger 504 may analyze the flight path data 525 to identify the flight path corresponding to the received identifier. In another embodiment, the flight manger 504 receives the detection unit output 210 from the detection unit 106 and/or the information processing system 504 and determines whether it is to initiate flight and which predefined flight path(s) to take based on the output 210 and the flight path data 524.

The power system(s) 510 provides power to the UAV 110 and its components. The power system(s) 510 may include batteries, photovoltaic components, fuel, and/or the like. The location determining system 512, in one embodiment, is a Global Positioning System (GPS), which generates and records location data, speed data, and altitude data of the UAV 110. The optional imaging system 516, in one embodiment, comprises one or more cameras (e.g., still, video, infrared, etc.) that capture images/frames of a video sequence or still photo sequence of an external environment.

The optional visual deterrence system 518 comprises visual mechanisms such as flashing/strobing lights, different colored lights, and/or the like that may be activated during UAV flight. The optional audible deterrence system 520 comprises audible mechanisms such as speakers, audio recordings, audio (including ultrasonic) generators, and/or the like that may be activated during UAV flight. The optional visual and audible deterrence systems 518, 520 are an additional deterrence feature in addition to the predefined flight paths for causing a bird to retreat from the substation area.

The optional collision avoidance system 522 comprises various sensors such as infrared sensors, ultrasonic sensors, and/or the like. The flight manager 504 utilizes feedback from the collision avoidance system 522 to determine if the UAV 110 is within a threshold distance from an object such as a bird 112. If the flight manager 504 determines the UAV 110 is within the threshold distance, the flight manager 504 alters the flight path of the UAV to avoid colliding with the bird 112. It should be noted that the flight manager 504 ensures any changes in the flight path do not cause the UAV 110 to collide with a substation component. In some embodiments, the optional collision avoidance system 522 receives images/video from the imaging system 516 and utilizes one or more object/feature detectors such as a trained objection detection model to detect a bird within the images/video and determine the UAV 110 is within the threshold distance. In another embodiment, the collision avoidance system 522 communicates with the UAV manager 304 of the information processing system 108. The UAV manager 304 then performs one or more functions of the flight manager 504 discussed above such as altering/modifying the predefined flight path of the UAV 110 to avoid a collision with a detected bird. The UAV manager 304 transmits the modified flight path to the UAV 110, which adjusts its flight path accordingly.

As discussed above, the detection unit(s) 106 of the deterrent system 104 scans the area surrounding the substation 102 by transmitting one or more of radio, light, and/or sound waves. The antenna 204 of the detection unit 106 receives one or more signals reflected back from various objects such as birds 112, 114, 116. The receiver 206 of the detection unit 106 processes the received signals and the decision module 208 compares the processed signals to one or more decision thresholds. For example, the decision module 208 compares the signals to a signal threshold to determine if a given characteristic(s) of the received signal is above a corresponding signal characteristic threshold. If so, then the decision module 208 determines that an object has been detected.

One or more output signals 210 are transmitted by the detection unit 106 to the information processing system 108 (or to the UAV 110) in response to the detection unit 106 determining that an object has been detected. In one embodiment, the output 210 comprises signal data that is utilized by the UAV manager 304 of the information processing system 108 to determine the type of object and the distance of the object from the geofence 118. For example, the information processing system 108 has access to various detection unit signatures of birds. The UAV manager 304 compares the output 210 of the detection unit to the avian signatures to determine if the output 210 corresponds to an avian signature. If so, the UAV manager 304 determines that the detected object is a bird. In some embodiments, a more granular analysis is performed such that the UAV manager 304 also determines the type of bird detected. In other embodiments, the UAV manager 304 assumes any detected object is a bird. For example, the detection unit 106 may be configured to only transmit an output signal to the information processing system 108 when a moving object of a given size is detected.

The output 210 of the detection unit 106 may also comprise data that is used by the UAV manager 304 to determine the distance of the detected bird from the geofence 118. For example, the output 210 of the detection unit 106 may comprise information such as the time lapse between transmitting a signal and detection of the return signal. The UAV manager 304 knows the speed of the transmitted signals (e.g., speed of light) and utilizes this information to determine how far the bird 112 is from the detection unit 106. In addition, the UAV manager 304 obtains the coordinates of the geofence 118 and the location of the detection unit 106 that transmitted the output from the system configuration data 310. Using this information and the determined distance of the bird 112 to detection unit 106 the UAV manager 304 is able to determine the location/distance of the bird 112 with respect to geofence 118.

In one embodiment, if the detected bird 112 is within a threshold distance to the geofence 118 the UAV manager 304 of the information processing system 108 the UAV manager 304 determines which sector(s) 120 to 126 of the geofence 118 to the send UAV 110 into. In an embodiment where a different detection unit 106 is assigned to a given sector of the geofence 118, the output 210 of a detection unit 106 includes its identifier. The UAV manager 304 analyzes the system configuration data 310 to determine the sector 120 to 126 assigned to the detection unit 106 corresponding to the identifier. In an embodiment where a single rotating detection unit 106 is utilized, the sector 120 to 126 may be determined based on the position of rotation at which a signal was transmitted by the detection unit 106 and the position of rotation at which a reflected signal was received. In other embodiments, the geofence 118 is not divided into sectors and the above operations are not required.

Once a sector(s) is identified, the UAV manager 304 analyzes the predefined flight path data 312 to select a predefined flight path for the UAV 110. For example, if the UAV manager 304 determines that a bird 112 has been detected within/near sector Sctr_A 120 the UAV manager 304 analyzes the flight path data 312 to identify one or more predefined flight paths/patterns for sector Sctr_A 120. Using the example shown in FIG. 4, the UAV manager 304 selects flight path FP_1. As discussed above, a given sector may be associated with one or more flight paths. The UAV manager 304 may select all or some of these flight paths.

If multiple flight paths exist for a given sector, the UAV manager 304 may select a flight path from the multiple flights in a sequential order or according to historical information indicating a rate of success for deterring birds 112. The historical information may be captured and stored based on video captured by the UAV 110 and the UAV manager 304 and/or flight manager 504 analyzing the video. Based on this analysis the UAV manager 304 and/or flight manager 504 may determine if the bird retreats from the substation area. In another embodiment, the UAV manager 304 comprises a randomizer that randomly selects one or more of the multiple flight paths for a given sector. As noted above, in some embodiments, the geofence 118 is not divided into sectors. In this embodiment, a flight path is selected that instructs the UAV 110 to fly around the entire substation 102. It should be noted that, in some embodiments, the detection unit 106 or the UAV 110 perform the functions of the information processing system 108 discussed above.

It should be note that the UAV manager 304 may select a predetermined flight path and/or activate the UAV 110 even if a detected bird 112 is not within the threshold distance to the geofence 118. For example, the current direction and speed of travel of the bird 112 can be determined based on data collected by the detection unit 106. The UAV manager 304 utilizes this data to predict if and when the bird 112 will be within the threshold distance to the geofence 118. The UAV manager 304 may then activate the UAV 110 utilizing this information.

Upon selection of one or more predefined flight paths for the UAV 110, the UAV manager 304 communicates with the UAV to initiate flight. In one embodiment, the UAV manager 304 sends one or more messages to the UAV 110 comprising an instruction to initiate flight. The message(s) may also comprise the selected flight path data. For example, if the UAV manager 304 selected flight path FP_1 the message may comprise the flight path identifier, the coordinates of the flight path, altitude data for the flight path, and speed data for the flight path. If the UAV 110 is to fly multiple flight paths the message may also indicate the order in which the flight paths are to be followed. In addition, the message may also indicate the number of times the UAV 110 is to traverse a given flight path. The flight manager 504 stores the received data as flight path data 524. The UAV manager 304 may also send the UAV 110 flight path data while it is currently traversing a given flight path. For example, the UAV manager 304 may want the UAV to continue flying once it has completed the current flight path and provides the UAV 110 with another flight path.

As discussed above, the flight path data 524 stored at the UAV may also be programmed into the UAV 110 such that the UAV 110 is not required to receive flight path data from the information processing system 108 (or detection unit 106). In this embodiment, the message(s) transmitted from the UAV manager 304 to the UAV 110 only needs to include a flight path identifier. The flight manager 504 of the UAV 110 analyze its flight path data 524 to identify the predefined flight path corresponding the received identifier. In another embodiment, the flight manager 504 of the UAV 110 may receive an identifier or coordinates of a geofence sector, relative location of a detected bird, identification of a detection unit that detected a bird, and/or the like from the information processing system and/or a detection unit(s). The flight manager 504 utilizes this information to select an appropriate flight path from the set of predefined flight paths 524 similar to that discussed above with respect to the UAV manager 304. If multiple flights paths are determined to be appropriate, the flight manager 504 may include a randomizer that randomly selects one of the multiple predefined flight paths. In addition, the flight manager 504 may select multiple flight paths and instruct the UAV 110 to traverse each selected flight path in a given or random order.

Once the flight manager 504 of the UAV 110 determines that flight is to be initiated and has obtained flight path data 524, the flight manager 504 programs the UAV 110 according to the flight path data and initiates flight. The UAV 110 then travels the predefined flight path according to the flight path data. For example, the UAV 110 traverses the predefined flight path FP_1 in sector Sctr_A 120 shown in FIG. 1. As noted above, the UAV 110 follows a predefined path/pattern, altitude, and speed according to the flight path data. The flight manager 504 keeps the UAV 110 on course utilizing the location, speed, and altitude data received from the location determining system 512. The flight manager 504 may activate any visual and/or audible deterrence mechanisms according to the flight path data and/or in response to detecting a bird within a given distance to the UAV 110. In some embodiments, the flight manager 504 activates the collision avoidance system to ensure the UAV does not collide with the detected bird.

In some embodiments, the detection unit 106 continues to track a detected bird 112 or at least output signals to the information processing system 108 associated with the detected bird 112. In this embodiment, the UAV manager 304 instructs the UAV 110 to fly continue traversing the predetermined flight path (or a new flight path provided by the UAV manager 304) until instructed to return to base by the UAV manager 304. Once the UAV manager 304 determines that the bird 112 is no longer within the substation area and/or within a threshold distance to the geofence 118 the UAV manager 304 sends an instruction to the UAV 110 to return to base. In addition, the flight manager 504 of the UAV 110 may monitor the power supply of the UAV 110 and instruct the UAV 110 to return to base when the power supply is below a given threshold.

Once the UAV 110 finishes traversing the predefined flight path or receives an instruction from the UAV manager 304 or flight manager 504 to return back to base, the UAV 110 returns back to its staring location such as a home base. It should be noted that embodiments of the present invention are not limited to a single UAV 110 and multiple UAVs may be dispatched for a single or multiple detected birds 112. If multiple UAVs are dispatched they can traverse the same flight paths within the same sector, traverse different (non-colliding) flight paths within the same sector, traverse flight paths for different sectors, and/or the like. The embodiments discussed above are advantageous because they prevent birds from entering the substation and/or encourage birds that have entered the substation to leave. This protects both the substation equipment and the birds from harm. A potential advantage of the predetermined flight path is that the UAV need not implement any portion of a bird interception flight, thereby reducing system complexity while also reducing any apprehension or stress experienced by the bird being deterred of a harmful UAV interception.

Figure 6:
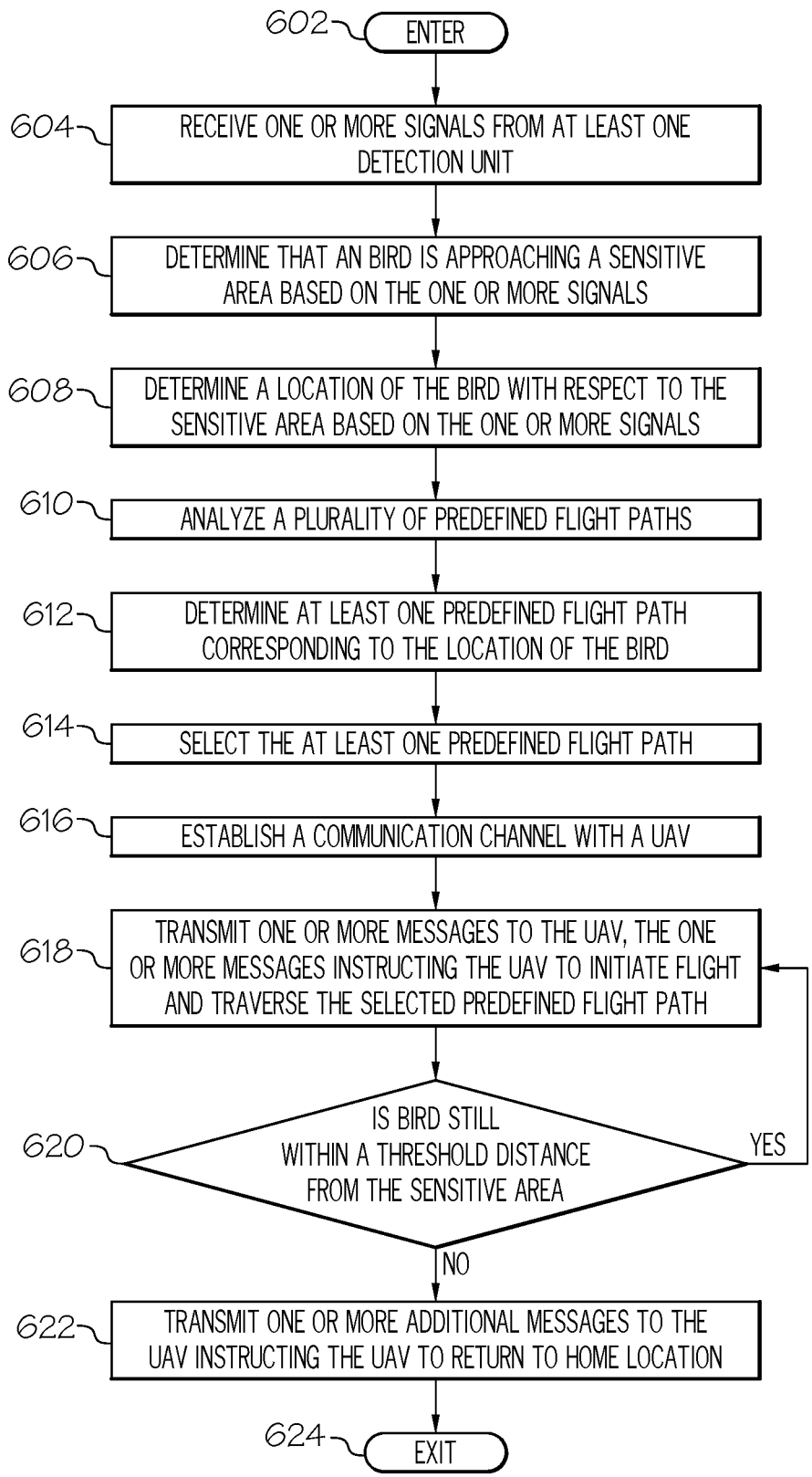
FIG. 6 is an operational flow diagram illustrating one example of deterring birds from entering a sensitive area according to one embodiment of the present invention.

FIG. 6 is an operational flow diagram illustrating one example of deterring birds from entering a sensitive area according to one embodiment. The operational flow diagram of FIG. 6 begins at step 602 and flows directly to step 604. The UAV manager 304, at step 604, receive one or more signals 210 from at least one detection unit 106. The UAV manager 304, at step 606, determines that a bird is approaching a sensitive area 102 based on the one or more signals 210. The UAV manager 304, at step 608, determines a location of the bird with respect to the sensitive area 102 based on the one or more signals 210.

The UAV manager 304, at step 610, analyzes a plurality of predefined flight paths 128 to 134. The UAV manager 304, at step 612, determines at least one predefined flight path corresponding to the location of the bird. The UAV manager 304, at step 614, the selects the at least one predefined flight path. The UAV manager 304, at step 616, establishes a communication channel with UAV 110. The UAV manager 304, at step 618, transmits one or more messages to the UAV 110, the one or more messages instructing the UAV 110 to initiate flight and traverse the selected predefined flight path. The UAV manager 304, at step 620, determines if the bird is still within a threshold distance from the sensitive area. If the result of this determination is positive, the control flow returns to step 618. In some embodiments, the control flow returns to step 618 for a predetermined maximum number (e.g., 1 or more) of flights. In other embodiments, the control flow returns to step 618 until the bird leaves the sensitive area. If the result of the determination at step 620 is negative, the UAV manager 304 transmits one or more additional messages to the UAV 110 instructing the UAV 110 to return to home location, at step 622. The control flow then exits at step 634

Figure 7:
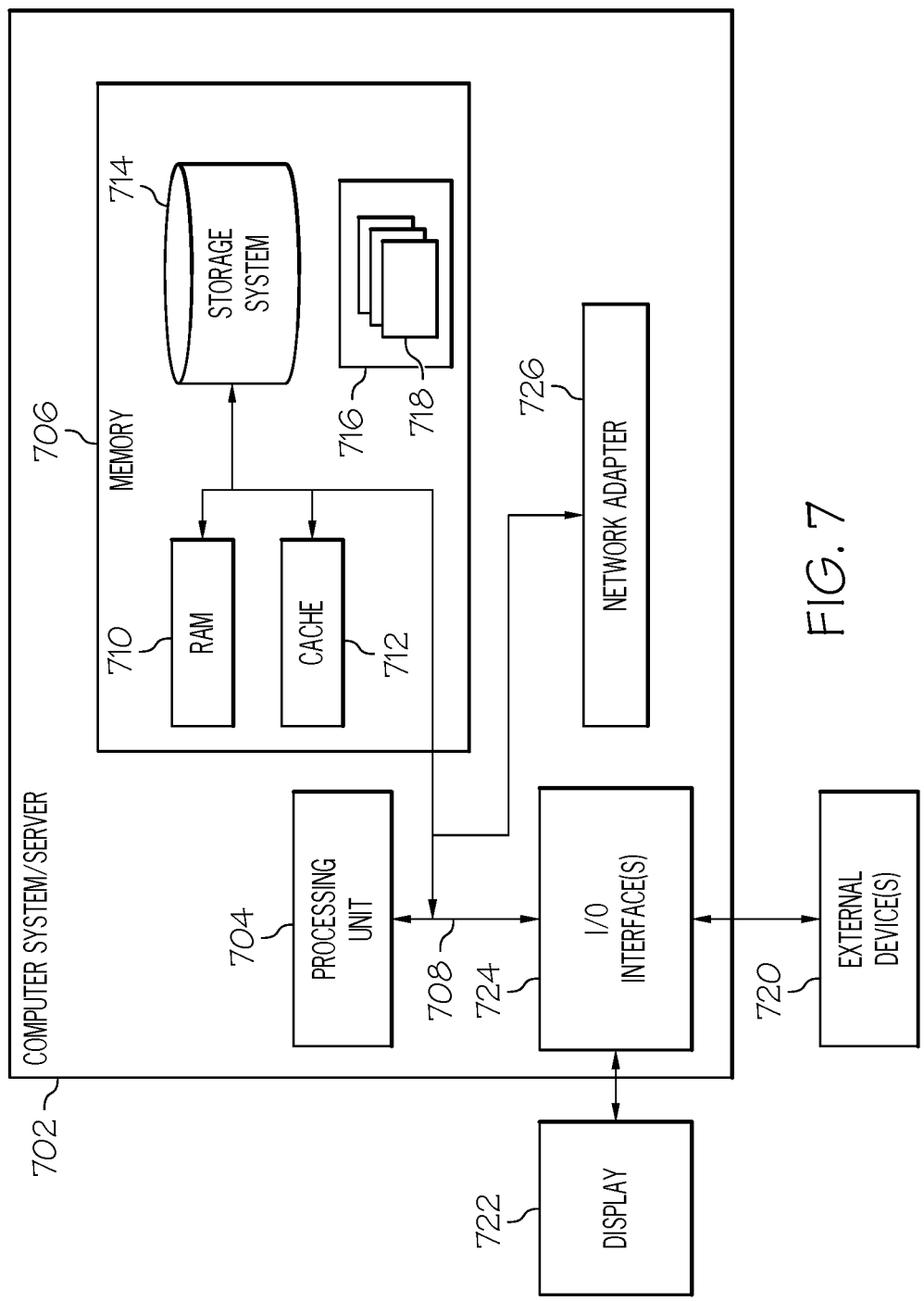
FIG. 7 is a block diagram illustrating another example of an information processing system according to one embodiment of the present invention.

Referring now to FIG. 7, this figure is a block diagram illustrating an information processing system that can be utilized in embodiments of the present invention. The information processing system 702 is based upon a suitably configured processing system configured to implement one or more embodiments of the present invention such as the UAV manager 304 of FIG. 3. The components of the information processing system 702 can include, but are not limited to, one or more processors or processing units 704, a system memory 706, and a bus 708, which couples various system components including the system memory 706 to the processor 704. The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 706 may include computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of an embodiment of the present invention.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the present invention.

The information processing system 702 can also communicate with one or more external devices 720 such as a keyboard, a pointing device, a display 722, etc.; one or more devices that enable a user to interact with the information processing system 702; and/or any devices (e.g., network card, modem, etc.) that enable computer system/server 702 to communicate with one or more other computing devices. Such communication can occur via I/O interfaces 724. Still yet, the information processing system 702 can communicate with one or more networks such as a local area network (LAN), a general wide area network (WAN), and/or a public network (e.g., the Internet) via network adapter 726. As depicted, the network adapter 726 communicates with the other components of information processing system 1002 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of deterring birds from approaching a sensitive area, the method comprising:
    determining that a bird is approaching a sensitive area;
    determining a location of the bird with respect to the sensitive area;
    comparing the location of the bird with location data associated with each predefined flight path of a plurality of predefined flight paths, wherein each predefined flight path is associated with a set of coordinates defining one or more flight patterns to be traversed within an area associated with the location data;
    selecting at least one predefined flight path from the plurality of predefined flight paths based on the location data of the at least one predefined flight corresponding to the location of the bird; and
    instructing an unmanned aerial vehicle to traverse the at least one predefined flight path that has been selected.

2. The method of claim 1, wherein determining that the bird is approaching the sensitive area comprises:
    receiving at least one signal from a detection unit, the signal at least indicating detection of the bird.

3. The method of claim 1, wherein the at least one predefined flight path is further selected from the plurality of predefined flight paths based on:
    determining that the bird is within a threshold distance from the sensitive area.

4. The method of claim 1, wherein each predefined flight path of the plurality of predefined flight paths is associated with at least one portion of a geographical area surrounding the sensitive area.

5. The method of claim 1, wherein each predefined flight path of the plurality of predefined flight paths is configured to avoid objects within the sensitive area.

6. The method of claim 1, further comprising:
    determining that the bird is beyond a given threshold distance from the sensitive area; and
    instructing the unmanned aerial vehicle to return to a home location.

7. The method of claim 1, wherein the sensitive area is an electrical power substation.

8. The method of claim 1, further comprising:
    determining a potential collision between the unmanned aerial vehicle and the bird; and
    modifying current predefined flight path of the unmanned aerial vehicle to avoid a collision between the unmanned aerial vehicle and the bird.

9. The method of claim 1, wherein selecting the at least one predefined flight path comprises selecting a plurality of predefined flight paths, and
    wherein instructing the unmanned aerial vehicle comprises instructing the unmanned aerial vehicle to traverse a plurality of the one or more flight patterns defined by the plurality of predefined flight paths in a random order.

10. An information processing system for deterring birds from approaching a sensitive area, the information processing system comprising:
    a processor;
    memory communicatively coupled to the processor; and
    an unmanned aerial vehicle manager communicatively coupled to the processor and the memory that, when operating, is configured to:
        determine that a bird is approaching a sensitive area;
        predict, based on the bird approaching the sensitive area, when the bird will be within a threshold distance to the sensitive area; and
        select a predefined flight path from a plurality of predefined flight paths, wherein each predefined flight path of the plurality of predefined paths is associated with a set of coordinates defining one or more flight patterns to be traversed within an area including at least a portion of the sensitive area, and
        instruct an unmanned aerial vehicle to traverse the predefined flight path that has been selected,
    wherein the unmanned aerial vehicle manager is configured to at least one of select the predefined flight path or instruct the unmanned aerial vehicle based on when the bird is predicted to be within the threshold distance.

11. The information processing system of claim 10, wherein the unmanned aerial vehicle manager is configured to determine that the bird is approaching the sensitive area based on:
    receiving at least one signal from a detection unit, the signal at least indicating detection of the bird.

12. The information processing system of claim 10, wherein the unmanned aerial vehicle manager is configured to select the predefined flight path from the plurality of predefined flight paths based on:
    determining that the bird is within a threshold distance from the sensitive area.

13. The information processing system of claim 10, wherein the unmanned aerial vehicle manager is configured to select the predefined flight path from the plurality of predefined flight paths based on:
    determining a location of the bird with respect to the sensitive area;
    determining that the predefined flight path corresponds to the location of the bird; and
    selecting the predefined flight path based on the predefined flight corresponding to the location of the bird.

14. The information processing system of claim 10, wherein each predefined flight path of the plurality of predefined flight paths is configured to avoid objects within the sensitive area.

15. A computer program product for deterring birds from approaching a sensitive area, the computer program product comprising:
- a non-transitory computer readable storage medium having computer readable program code embodied therewith, the computer readable program code comprising instructions for:
  - determining that a bird is approaching a sensitive area;
  - determining a location of the bird with respect to the sensitive area;
  - comparing the location of the bird with location data associated with each predefined flight path of a plurality of predefined flight paths, wherein each predefined flight path is associated with a set of coordinates defining one or more flight patterns to be traversed within an area associated with the location data;
  - selecting at least one predefined flight path from the plurality of predefined flight paths based on the location data of the at least one predefined flight path corresponding to the location of the bird; and
  - instructing an unmanned aerial vehicle to traverse the at least one predefined flight path that has been selected.

16. The computer program product of claim 15, wherein determining that the bird is approaching the sensitive area comprises:
- receiving at least one signal from a detection unit, the signal at least indicating detection of the bird.

17. The computer program product of claim 15, wherein the at least one predefined flight path is further selected from the plurality of predefined flight paths based on:
- determining that the bird is within a threshold distance from the sensitive area.

18. The computer program product of claim 15, wherein each predefined flight path of the plurality of predefined flight paths is configured to avoid objects within the sensitive area.

19. The computer program product of claim 15, wherein the computer readable program code further comprising instructions for:
- determining that the bird is beyond a given threshold distance from the sensitive area; and
- instructing the unmanned aerial vehicle to return to a home location.

\* \* \* \* \*